US008368586B2

(12) United States Patent
Mohamadi et al.

(10) Patent No.: US 8,368,586 B2
(45) Date of Patent: Feb. 5, 2013

(54) PERSON-BORNE IMPROVISED EXPLOSIVE DEVICE DETECTION

(75) Inventors: Farrokh Mohamadi, Newport Beach, CA (US); Mikko Oijala, Newport Beach, CA (US); Mohsen Zolghadri, Newport Beach, CA (US); Paul Strauch, Newport Beach, CA (US)

(73) Assignee: Tialinx, Inc., Newport Beach, CA (US)

( * ) Notice: Subject to any disclaimer, the term of this patent is extended or adjusted under 35 U.S.C. 154(b) by 364 days.

(21) Appl. No.: 12/852,440

(22) Filed: Aug. 6, 2010

(65) Prior Publication Data

US 2010/0295718 A1 Nov. 25, 2010

Related U.S. Application Data

(63) Continuation-in-part of application No. 12/732,163, filed on Mar. 25, 2010.

(60) Provisional application No. 61/324,264, filed on Apr. 14, 2010, provisional application No. 61/164,855, filed on Mar. 30, 2009, provisional application No. 61/239,752, filed on Sep. 3, 2009, provisional application No. 61/163,742, filed on Mar. 26, 2009.

(51) Int. Cl.
*G01S 13/86* (2006.01)
*G01S 13/89* (2006.01)
*G01S 13/00* (2006.01)

(52) U.S. Cl. ........... 342/66; 342/21; 342/22; 342/27; 342/28; 342/52; 342/55; 342/59; 342/61; 342/89; 342/90; 342/147; 342/158; 342/175; 342/176; 342/179; 342/188; 342/192; 342/195; 342/196

(58) Field of Classification Search .......... 342/21, 342/22, 27, 28, 52, 53, 55, 59, 175, 176, 342/179, 188, 192–197, 61, 66, 89, 90, 104, 342/115, 147, 158–164
See application file for complete search history.

(56) References Cited

U.S. PATENT DOCUMENTS

| | | | | |
|---|---|---|---|---|
| 3,068,468 A * | 12/1962 | Bretscher et al. | | 342/66 |
| 3,148,015 A * | 9/1964 | Weaver | | 342/66 |
| 5,381,156 A * | 1/1995 | Bock et al. | | 342/59 |
| 6,292,130 B1 * | 9/2001 | Cavallaro et al. | | 342/55 |
| 6,456,232 B1 * | 9/2002 | Milnes et al. | | 342/104 |
| 7,321,330 B2 * | 1/2008 | Sajima | | 342/59 |
| 7,940,208 B2 * | 5/2011 | Baharav et al. | | 342/179 |
| 8,009,081 B2 * | 8/2011 | Hong et al. | | 342/52 |
| 2005/0270220 A1 * | 12/2005 | Baharav et al. | | 342/22 |

OTHER PUBLICATIONS

Maltsev, Alexander, "Experimental Investigation of Polarization Impact on 60 GHz WLAN Systems", IEEE 802.11-09/0552er0, May 2009, 24 pages, available on internet at "https://mentor.ieee.org/802.11/den/09/11-09-0552-00-00ad-experimental-investigation-of-polarization-impact-on-60-ghz-wlan-systems.ppt".
Matthews, William, "Hand-held Detection Devices", Defense News, Jan. 25, 2010, 2 pages., available on the internet at "http://www.defensenews.com/story.php?i=4468302".

* cited by examiner

*Primary Examiner* — Bernarr Gregory
(74) *Attorney, Agent, or Firm* — Haynes and Boone, LLP

(57) ABSTRACT

A system includes a multi-system approach to detecting concealed weapons and person borne improvised explosive devices (PBIED). A first and second radar system operate at different center frequencies to provide, respectively, isolation of a target of interest from clutter and fine detail information on the target, such as whether the target is a living person, whether a concealed object may be present, material composition of the object, and shape, size, and position of the target relative to the system. Circular polarized radar beam may be used to distinguish a suspect object from within a crowd of people. Radar image of the object may be overlaid on visual image of a person carrying the object. Radar tracking of the object is coordinated with visual tracking of the target provided by a camera system, with visual display and tracking of the target overlaid with the radar information.

20 Claims, 14 Drawing Sheets

PERSON-BORNE IMPROVISED EXPLOSIVE DEVICE DETECTION

CROSS REFERENCE TO RELATED APPLICATIONS

This application is a continuation-in-part of co-pending U.S. patent application Ser. No. 12/732,163, filed Mar. 25, 2010, of which it claims the benefit, and also claims the benefit of U.S. Provisional Application No. 61/324,264, filed Apr. 14, 2010, both of which are incorporated by reference. In addition, this application claims the benefit of the following, through its parent U.S. patent application Ser. No. 12/732, 163, of which it is a continuation-in-part, which claims the benefit of U.S. Provisional Application No. 61/164,855, filed Mar. 30, 2009; U.S. Provisional Application No. 61/239,752, filed Sep. 3, 2009; and U.S. Provisional Application No. 61/163,742, filed Mar. 26, 2009, all of which are hereby incorporated by reference.

BACKGROUND

The present disclosure generally relates to radio frequency (RF) detection and ranging (RADAR) and, more particularly, to surveillance systems capable of discriminating living individuals from inanimate objects and detecting whether an individual may be carrying an object of interest such as a concealed weapon or an improvised explosive device (IED).

Portable, hand-held radars have been used for detection of hidden objects, e.g., objects such as weapons hidden behind a wall of a building. Such technology holds promise for use in situations where surveillance of an inhabitable area from behind a building wall may be desired, for example, for protection of an office space, with the detection system located inside the office, from individuals having access to hallways or areas nearby but outside the office. In some situations, e.g., police work, military combat scenarios, or fire and rescue situations, it may be desirable to be able to detect living individuals, and various objects that may be in their possession using a portable, hand-held radar system from outside a building, for example, occupied by the individuals.

An important case of detecting living individuals, and various objects that may be in their possession, is the detection of improvised explosive devices (IED) carried by a person. One of the most important and difficult aspects of the person-borne IED (PBIED) detection problem is reliable, verifiable interrogation of all individuals in an unstructured crowd at a large public event (e.g. a crowded market square). The Joint IED Defeat Organization (JIEDDO) is also interested in a more manageable problem of interrogation at controlled access points with, for example, individuals queued up in a one-at-a-time scenario for interrogation by portal or other fixed-site technologies (e.g. an election polling station). Such waiting lines represent targets of opportunity for bombers; therefore JIEDDO has been interested in solutions that address the crowd problem without requiring the cooperation or even knowledge of the individual being interrogated.

SUMMARY

According to one embodiment, a system includes: a first ultra-wideband (UWB) radar system configured to operate at a first center frequency; a second ultra-wideband (UWB) radar system configured to operate at a second center frequency that is higher than the first center frequency; a camera system configured to operate in conjunction with at least one of the first and second radar systems; and a processing unit for providing coarse analysis of clutter using data provided by the first radar system, biorhythmic analysis using fine beam data provided by the second radar system, and focusing the camera system based on the biorhythmic analysis.

According to another embodiment, a method includes: scanning an inhabitable area using a first ultra-wideband (UWB) radar system operating at a first center frequency; performing coarse analysis using data provided by the first radar system to isolate a target of interest from clutter; scanning the target using a second ultra-wideband (UWB) radar system operating at a second center frequency that is higher than the first center frequency; performing fine analysis using narrow beam data provided by the second radar system; and focusing the camera system on the target.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. Like reference numerals are used to identify like elements illustrated in one or more of the figures.

DETAILED DESCRIPTION

In accordance with one or more embodiments of the present invention, systems and methods disclosed herein include a multi-sensor, system-of-systems approach for detecting person-borne IED weapons that addresses issues of occlusion, look angle, and potentially large numbers of individuals present, for which no single sensor system could provide adequate coverage. One embodiment combines a 5 Giga Hertz (GHz) ultra-wideband (UWB) radar imaging system, a very high frequency, e.g., 60 GHz ultra-wideband radar imaging system, and off-the-shelf optical zooming devices where optical zooming is switchable and the video image is fused to the RF image using 60 GHz radar zooming by applying a very narrow RF beam. Embodiments may be used to identify and differentiate multiple individuals, track the individuals' motion and display the tracking in real time, identify objects, such as a concealed weapon or PBIED that may be carried by any of the individuals, and may aid in efforts to eliminate the PBIED as a weapon system of strategic influence.

Other embodiments of such an ultra-wideband radar imaging system also may be valuable for surveillance to protect an inhabitable area—an office space or living space, for example—with the detection system located inside the space, from individuals behind a building wall and having access to hallways or areas nearby but outside the space. A similar but alternative scenario may be one in which the space under surveillance is protected by a covert detection system hidden from the space, located outside the space behind a wall. An ultra-wideband radar imaging system may also be useful, for example, to persons outside a building (e.g., fire, rescue workers, military, police, or others) requiring surveillance or intelligence data (e.g., detection of living persons and various objects that may be in their possession) regarding individuals occupying the building when entering the building is not practical, permissible, or safe. For an example that has received attention recently, such a system could be useful to rescue workers for locating earthquake victims trapped inside damaged buildings.

Figure 1:
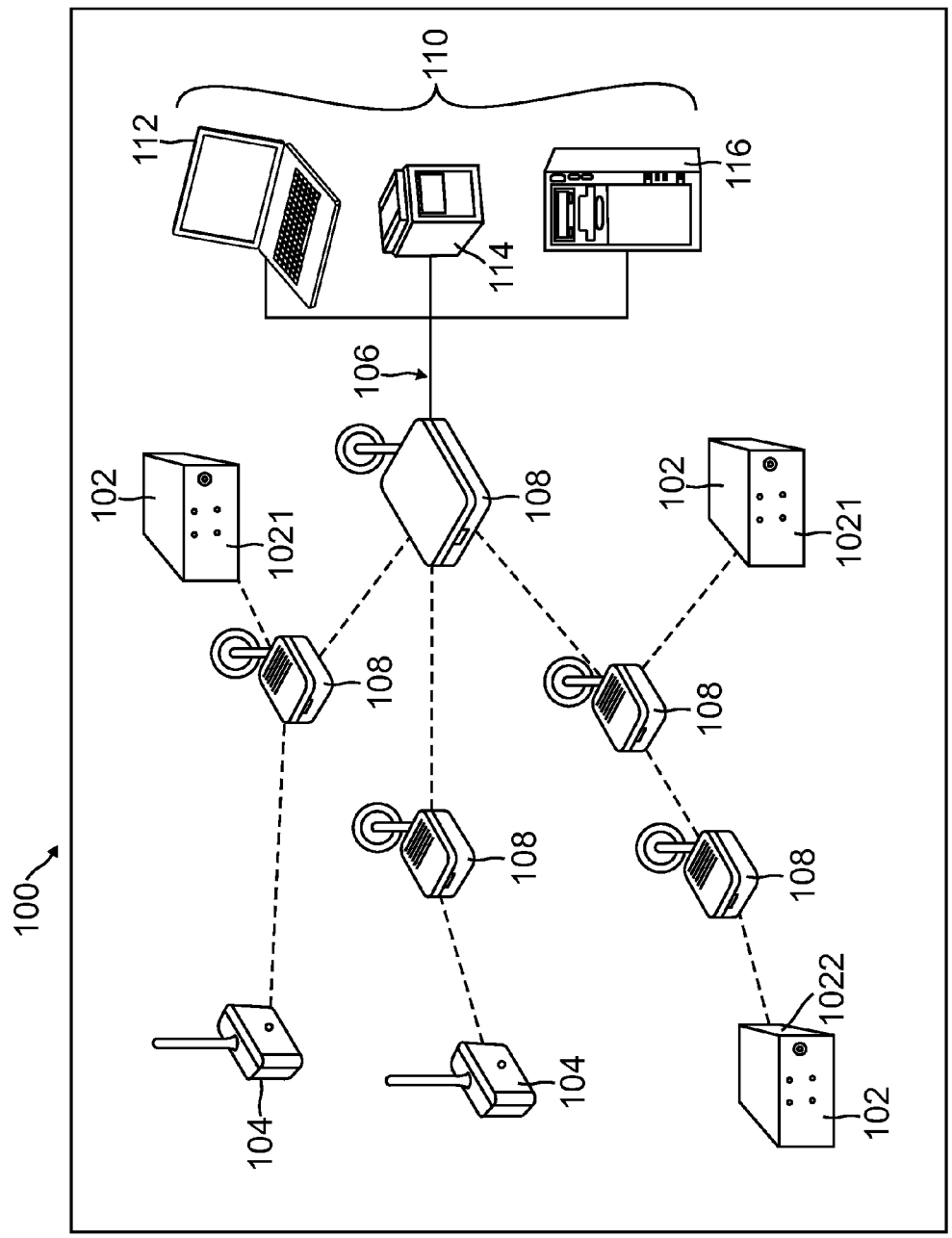
FIG. 1 is a system diagram illustrative of one example of a system architecture for an RF imaging system in accordance with one embodiment.

FIG. 1 illustrates an RF imaging system 100 according to one or more embodiments. RF imaging system 100 may include a number of radar units 102, which may be ultra-wideband 60 GHz radar units. Among radar units 102, some radar units, e.g., radar units 1021, may operate in a covert motion detector mode, and other radar units, e.g., radar unit 1022 may operate in a covert RF imaging mode. RF imaging system 100 may include a number of complementary sensors 104. Complementary sensors 104 may be, for example, additional radar units 102, infrared motion detectors, or video cameras. Radar units 102 and complementary sensors 104 may communicate via a communication network 106, which may be, for example, an enterprise network. Communication network 106 may comprise, for example, a number of routers 108, which may be wireless routers, as shown in FIG. 1. Radar units 102 and complementary sensors 104 may communicate via wireless communication network 106 with a computer system 110. Computer system 110 may include a personal computer 112, for example, a mass storage unit 114, in communication with and accessible by the personal computer 112, and a server machine 116, also in communication with mass storage unit 114 and personal computer 112, and accessible by personal computer 112. Wireless communication network 106 allows flexibility in placement of the radar units 102, in particular radar detector units 1021 and complementary sensors 104 of system 100. Each component of system 100 may be geo-located by applications of a GPS (global positioning system) or gyro-based system. The entire RF imaging system 100, including the cluster of sensors (e.g., detector units 1021, sensors 104) may be synchronized (e.g., using the GPS clock signal) and synchronized radar scan data and sensor data may be taken from various angles and locations of the radar detectors 102 and sensors 104. Such geo-locating and synchronizing of units may enable highly accurate positioning and tracking of targets, such as by using triangulation of target data, for example.

Figure 2:
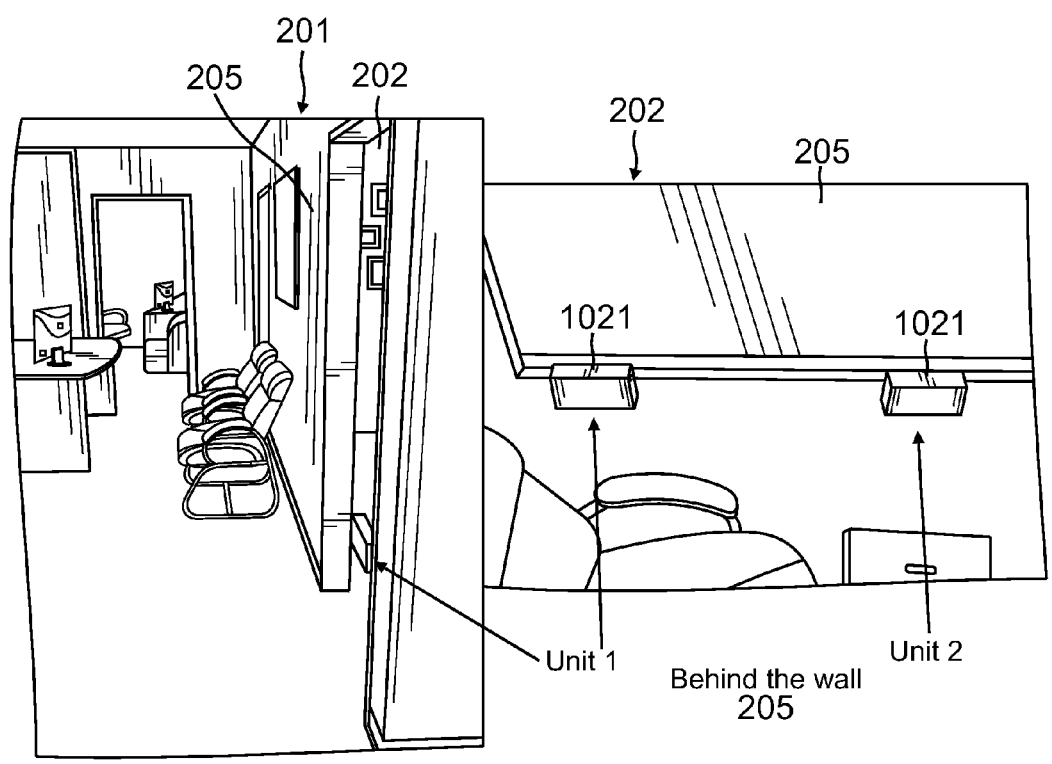
FIG. 2 is a perspective diagram illustrating an example of a physical layout for surveillance in an office setting of RF imaging system components in accordance with an embodiment.

FIG. 2 illustrates an example of a physical layout of components of RF imaging system 100 for surveillance of an inhabitable area, the particular example showing an office setting. As seen in FIG. 2, RF imaging system 100 may be used for surveillance of office space 201 from office space 202 with placement of radar detector units 1021 behind wall 205, hidden from space 201. For monitoring RF imaging system 100, personal computer 112 may be located in space 202 or anywhere that is within range of wireless communication network 106 connectivity. Thus, flexibility of operation is provided, for example, for covert surveillance and monitoring of space 201. The same flexibility for monitoring locations may be useful for other applications of RF imaging system 100, such as the examples provided above. For example, system 100 can be installed inside or outside a building or used as a portable interrogator in a military setting, for example, in a search and track mission to detect and track individuals and weapons hidden behind walls. System 100 can also be augmented with complementary sensors 104—such as infrared (IR) or video cameras—for thermal and visual inspection.

Referring now to both FIG. 1 and FIG. 2, system 100 may include radar detector units 1021 that may provide raw data from scanning space 201 to a signal processing and imaging module (included in radar imaging unit 1022, for example) that may include a computer processor. The ultra-wideband radar detector units 1021 and radar imaging unit 1022 may send very narrow pulses and perform required signal processing on the response provided by the reflected pulses (also referred to as "scan data") to construct a digitized representation of a target (e.g., an individual entering or occupying space 201). The radar transmitter of each unit 102 (including units 1021, 1022) may emit rapid wideband radar pulses, each pulse of approximately 100-200 pico-second duration. The radars (e.g., units 102) of system 100 may, for example, transmit 100 pico-second Gaussian pulses at a 5 GHz or 60 GHz center frequency. These micro-wave or millimeter-wave pulses can penetrate glass, wood, soil, concrete, dry wall, and bricks—with varying attenuation constant, depending on the material. The pulses may be repeated at a chosen pulse repetition frequency (PRF). By choosing a PRF in the range of 1-10 MHz and appropriate average transmitter power, a surveillance range of about 50-500 feet (ft) can generally be achieved. To illustrate: using the short duration pulses just described, for example, and a PRF at about 10 MHz, surveillance in a range of about 0-50 ft may be accomplished; and with a PRF at about 1 MHz, surveillance in a range of about 450-500 ft may be accomplished.

For example, a 5 GHz center-frequency radar unit, as in one embodiment, may include an ultra-wideband high-performance, portable radio-frequency imaging module which enables detection of solid items or liquid layers placed behind a wall or otherwise concealed, whether stationary or in a state of motion. For example, three versions of the module may be based on the same core hardware and software framework: 1) an underground motion detection sensor system; 2) a mountable sensor cluster system; and 3) a portable hand-held unit. In each version, the module's scanner transmits sub-nanosecond pulses that can penetrate and be reflected in the ground, concrete, wood, or other solid or liquid items for "sensing" them. The low-power module may utilize pulses in the license free 3 to 8 GHz band with 5 GHz bandwidth compliant with the FCC power spectrum. Depending on the width and depth of the item being scanned, the pulses can penetrate up to 120 ft in air for slightest movement detection using a single pair of antenna and low power mode. The module's pulse detector receives the "bounce-back" signals from the transmitter and builds the image of the reflections for classification based on the size of an object. The module may have multiple options for field of view (FOV), for example, a 140 degrees FOV and a 30 degrees FOV for more focused scanning of a target.

Also for example, a 60 GHz center frequency radar unit of one embodiment may operate at a 60 GHz unlicensed band, e.g., V band, with 57 GHz to 64 GHz bandwidth. A 60 GHz center-frequency radar operating with an ultra-wideband 7 GHz bandwidth may provide for a very fine resolution imaging radar as an enhanced version of a 5 GHz center frequency ultra-wideband radar that provides a four-times enhancement in millimeter wave radio frequency imaging resolution of concealed material such as IEDs. In one embodiment, a 60 GHz center-frequency ultra-wideband radar may combine significant depth resolution enhancement with a miniaturized antenna array that produces a very narrow beam width, providing improved lateral resolution for producing RF images of the scanned material. For example, miniaturization may provide an i-Phone®-size multi-sensor system such as one embodiment shown, for example, in FIG. 8B.

An array of dipole, patch, or spiral antennas may be employed to enhance antenna directionality and enable beam forming. For example, radar units 102 may achieve a range resolution of about 2 mm Using an integrated antenna module with 1024 antenna elements, radar units 102 may achieve a beam width less than about 2 degrees. In the receiver of each radar unit 102, a correlator pulse detector circuit may be employed to identify reflections of the pulses. Amplitude and delay information may be extracted and processed in an integrated signal processor, which may be included, for example, in the signal processing and imaging module of one of the radar units 102, e.g., RF imaging unit 1022. Image construction algorithms may be implemented using digital signal processing (DSP) and may yield a two-dimensional (2D) or three-dimensional (3D) image of individuals and objects in the inhabitable area subjected to surveillance, e.g., space 201, on a display screen such as that provided by personal computer 112 of system 100.

Figure 3:
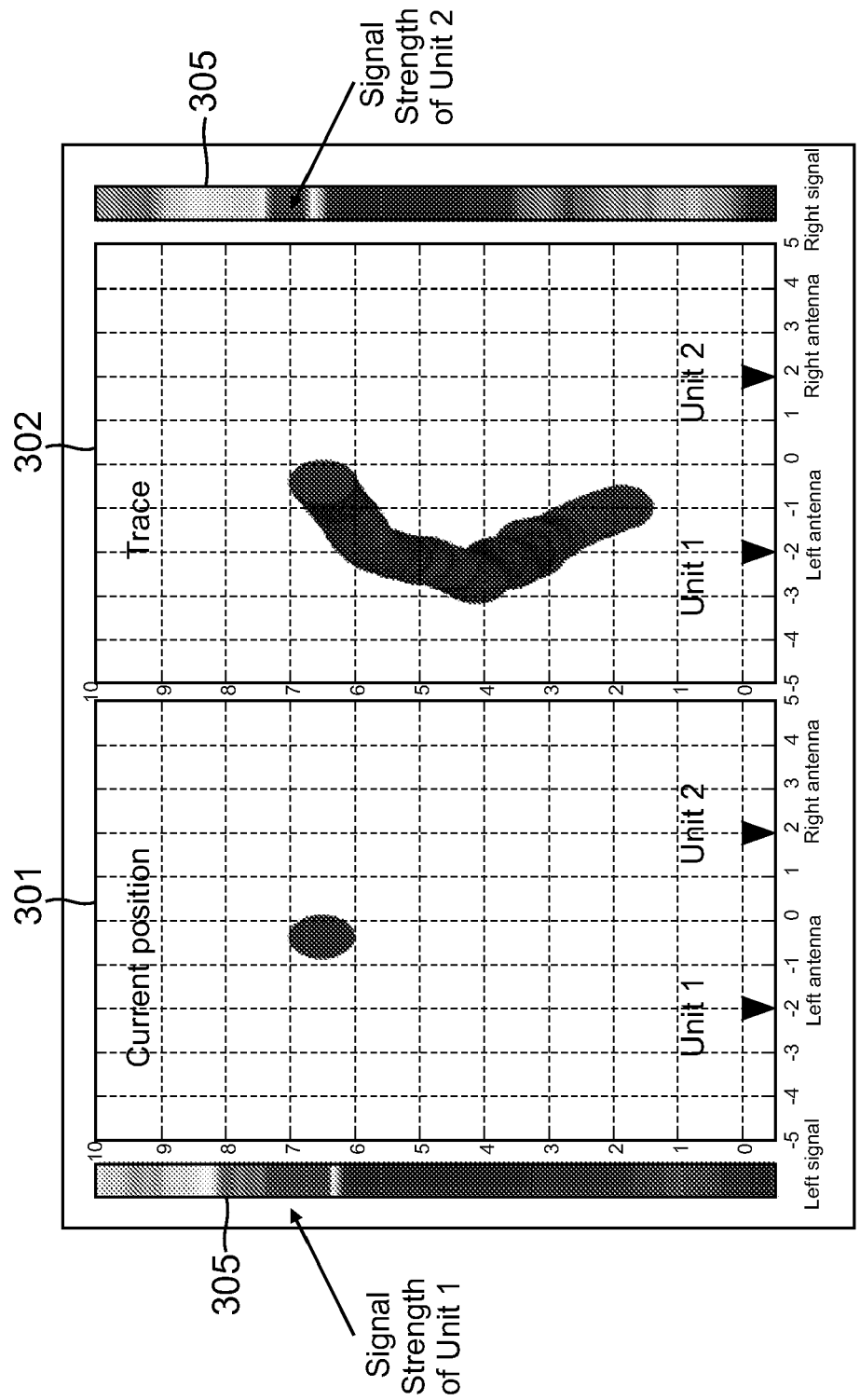
FIG. 3 is an example of a system interface display for providing surveillance information to a user from an RF imaging system in accordance with an embodiment.

FIG. 3 illustrates an example of a system interface display 300 for providing surveillance information to a user from RF imaging system 100. The display may be presented, for example, on a monitor of personal computer 112 of computer system 110. For the example shown in FIG. 3, the image may be constructed from information provided by the two sensor units 1021 (labeled "Unit 1" and "Unit 2") shown in FIG. 2. The images shown in display 300 may be oriented relative to the actual space under surveillance in accordance with the locations of Unit 1 and Unit 2, the positions of which are indicated in the display 300—in the present example, at the bottom of display 300. Display portion 301 of display 300 shows, for example, the current position of a "target", e.g., person or object of interest in the space under surveillance, relative to the locations of Unit 1 and Unit 2 sensors 1021. Display portion 302 of display 300 may show, for example, a trace or track of the changing positions of the target shown in display portion 301, relative to the locations of Unit 1 and Unit 2 sensors 1021. The target tracking and trace of target movement shown in display portion 302 may be provided in real time, as described below with reference to FIG. 6 and FIG. 7. In addition, graphical indications 305 of signal strength for each of the two units may be provided.

Figure 4A:
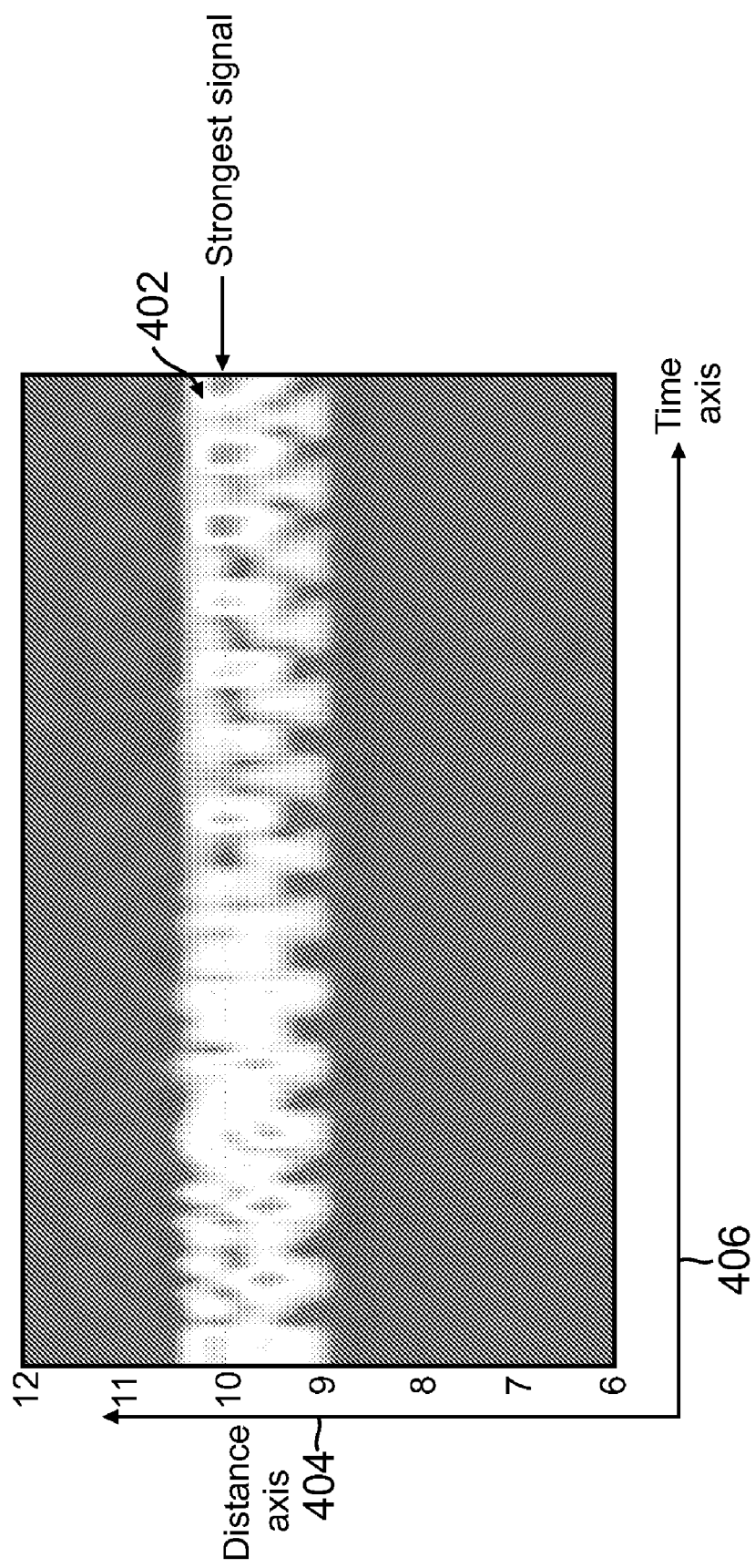
FIG. 4A is a time domain display showing radar scan ranging samples taken over a time period of a few seconds that may be used to indicate target movement or biometric data to a user of an RF imaging system in accordance with an embodiment.

FIG. 4A is a time domain display provided by RF imaging system 100 showing radar scan ranging samples taken over a time period of a few seconds that may be used to indicate target movement or biometric data. FIG. 4A shows a scan lasting a few seconds of a person sitting approximately 10 ft away from a radar unit 102. Scan samples 402 may form a distinct pattern of a heartbeat that can be observed at a distance of about 10 ft. For example, the distance of a sample 402 along the distance axis 404 may vary from sample to sample as time progresses along time axis 406. The scan rate for the example of FIG. 4A is approximately 7.5 scans/second. The scan rate for the example may allow analyzing the signal frequencies up to about 3.75 Hz, a frequency which most human heartbeats should be less than so as to avoid aliasing in the sampling. The scan may be differential, e.g., the data displayed and analyzed may be a difference between a current scan and a fixed reference background scan. Other biometric data as well as heartbeat may detected or used for surveillance, and the scan rate may be adjusted accordingly. For example, respiration may be detected, e.g., based on diaphragm movement; and bodily or limb movement such as hand or foot movements may be detected.

Figure 4B:
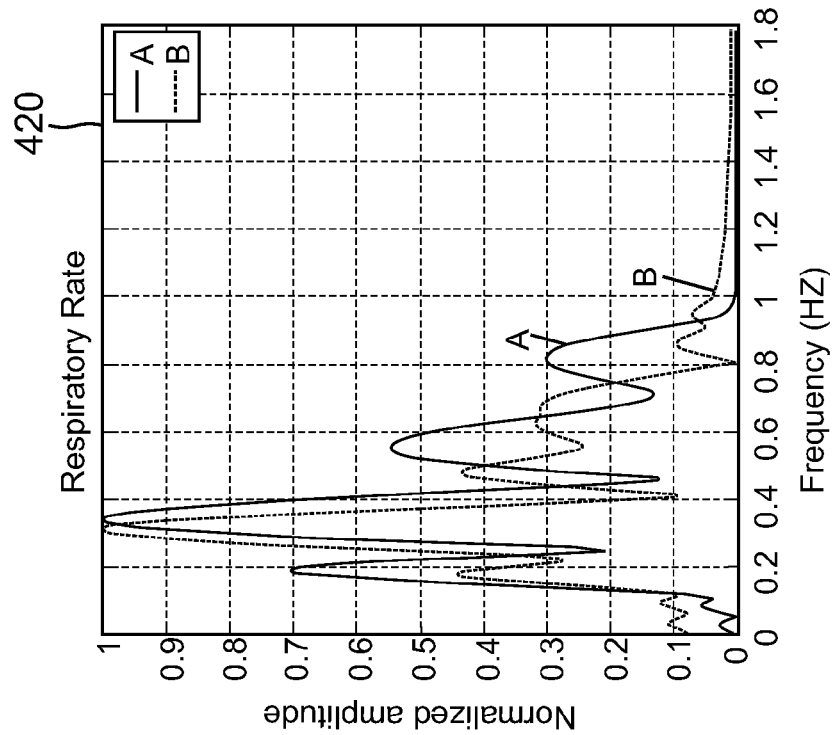
FIG. 4B is a set of frequency domain signal strength graphs illustrating a capability for discriminating heartbeat and respiration of live individuals by an RF imaging system in accordance with an embodiment.
Figure 4B:
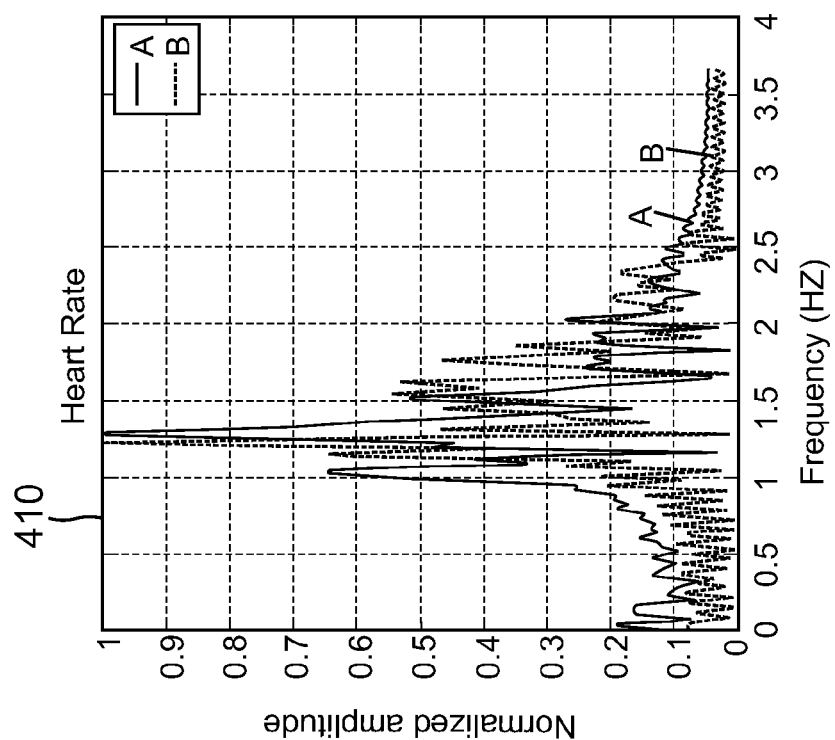

In order to extract the rate of the heartbeat—for example—system 100 may perform a frequency analysis (e.g., using FFT) along the time axis 406 on the signal at a distance along axis 404 from the radar unit 102 for which the signal is strongest (e.g., average signal), as indicated in FIG. 4A, occurring at 10 ft (on axis 404) from the radar unit for the particular example shown. The results of the FFT processing may be displayed by RF imaging system 100 as a frequency domain graph 410 such as shown in FIG. 4B. From the location of the highest peak shown in the graph 410, the frequency of the signal can be estimated and displayed as a number (in this example, approximately 1.3 Hz which is about 78 beats/minute).

FIG. 4B is a pair of signal strength graphs 410 and 420 illustrating a capability for discriminating heartbeat and respiration of live individuals using RF imaging system 100. Ultra-wideband sensors that operate in the 60 GHz range—such as radar units 102—can be accurate enough to discriminate a live person from a distance (e.g., within the surveillance range exemplified above) or from behind an obstacle (e.g., office wall 205). In FIG. 4B, graph 410 shows a frequency spectrum for heart rate and graph 420 shows a frequency spectrum for respiration rate for two different subject individuals A and B. For example, the plots may be produced from persons (subject A and subject B, also referred to as "targets") standing 1 foot from a six-inch-thick wall behind which are located radar detector units 1021 at approximately 2 feet away from the wall (e.g., wall 205).

Cardiac muscles and lungs periodically fluctuate and their movements typically have frequencies in the range of approximately 0.8 through 2.5 Hz (Hertz). Combined with recovered target size and shape information, heart rate and respiration rate may be used as indicators to differentiate between a live person, an animal or an object to reduce the occurrence of false alarms. For example, the particular profiles of frequencies seen in graphs 410, 420 for subjects A and B may be considered characteristic of human individuals. For example, in a test scenario lasting about 30 seconds, scanned reflection waveforms were captured at 7.3 Hz (e.g., time domain waveforms at center frequency of 60 GHz, pulsed at PRF between 1 to 10 MHz, and scanned at a scan repetition rate of 7.3 Hz), recorded, and analyzed. The time domain waveforms (such as that shown in FIG. 4A) of the scan data were re-shaped for motion (e.g., re-shaped for better detection of heart and respiratory motion) and low pass filtered and transformed to frequency domain to determine the peak frequency content in the range of approximately zero to 1.0 Hz for respiratory rate detection and about 0.8 to 2.5 Hz for heart rate detection. By comparing the scan data to the pre-determined profiles, system 100 may be used to differentiate between non-moving and moving targets, and between animals and humans.

Figure 4C:
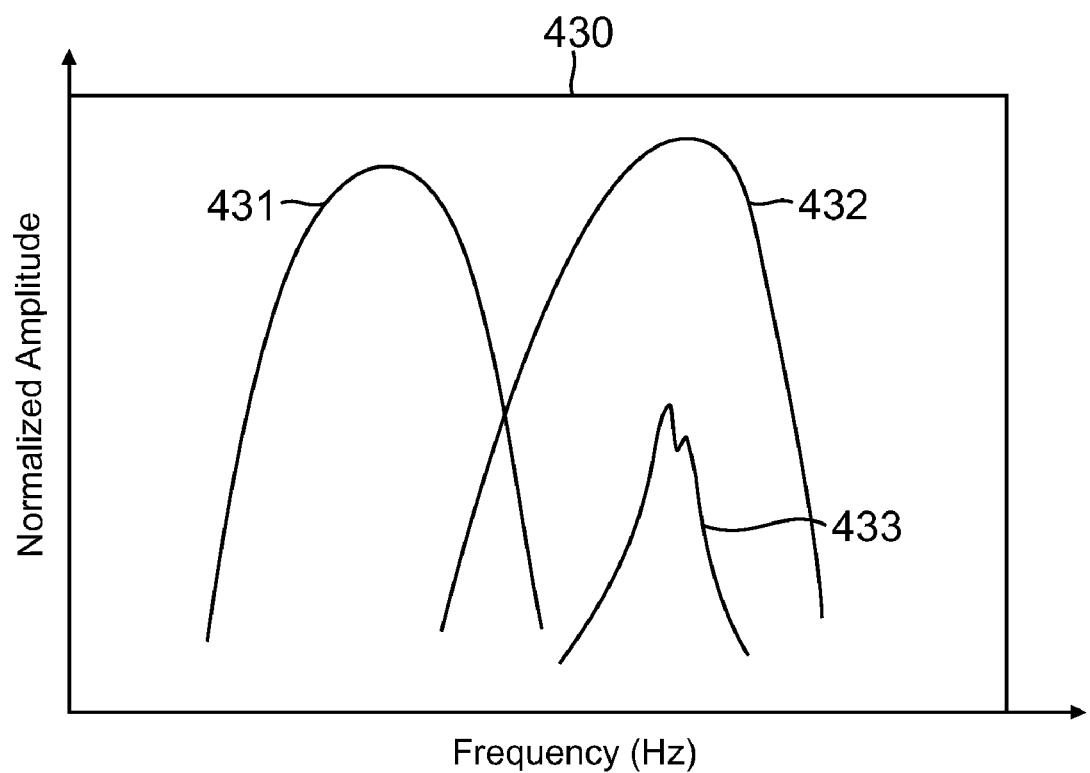
FIG. 4C is a frequency domain signal strength graph illustrating one example of capability for discriminating variable biometric data within and between differing species using an RF imaging system in accordance with an embodiment.

FIG. 4C is a frequency domain signal strength graph 430 illustrating one example of capability for discriminating variable biometric data within and between differing species using an RF imaging system 100. Frequency profile 431 may be, for example, a heartbeat profile having a signature (e.g. specific form or shape, such as the rounded shape indicated in FIG. 4C for illustration only) indicating a human target. If the target individual experiences an increase in pulse rate, the profile 432 may shift to the right on graph 430 as frequencies in the profile increase, but the profile may keep its characteristic human signature (e.g., the rounded shape of profile 432 is similar to that of profile 431). On the other hand, for a different species—such as a dog—the profile 433 may occur at roughly the same frequencies as that of the human at higher pulse rate (profile 432), as a smaller animal would generally have a higher pulse rate, but the signature of dog heartbeat profile 433 (e.g., more pointed and less area beneath the graph in the example shown for illustration in FIG. 4C) may be markedly different from the signature of human heartbeat profile 431, 432. Although, heartbeat is used for illustration, system 100 may be capable of using respiration profiles or any other biometric characteristics detectable as movement.

Figure 5:
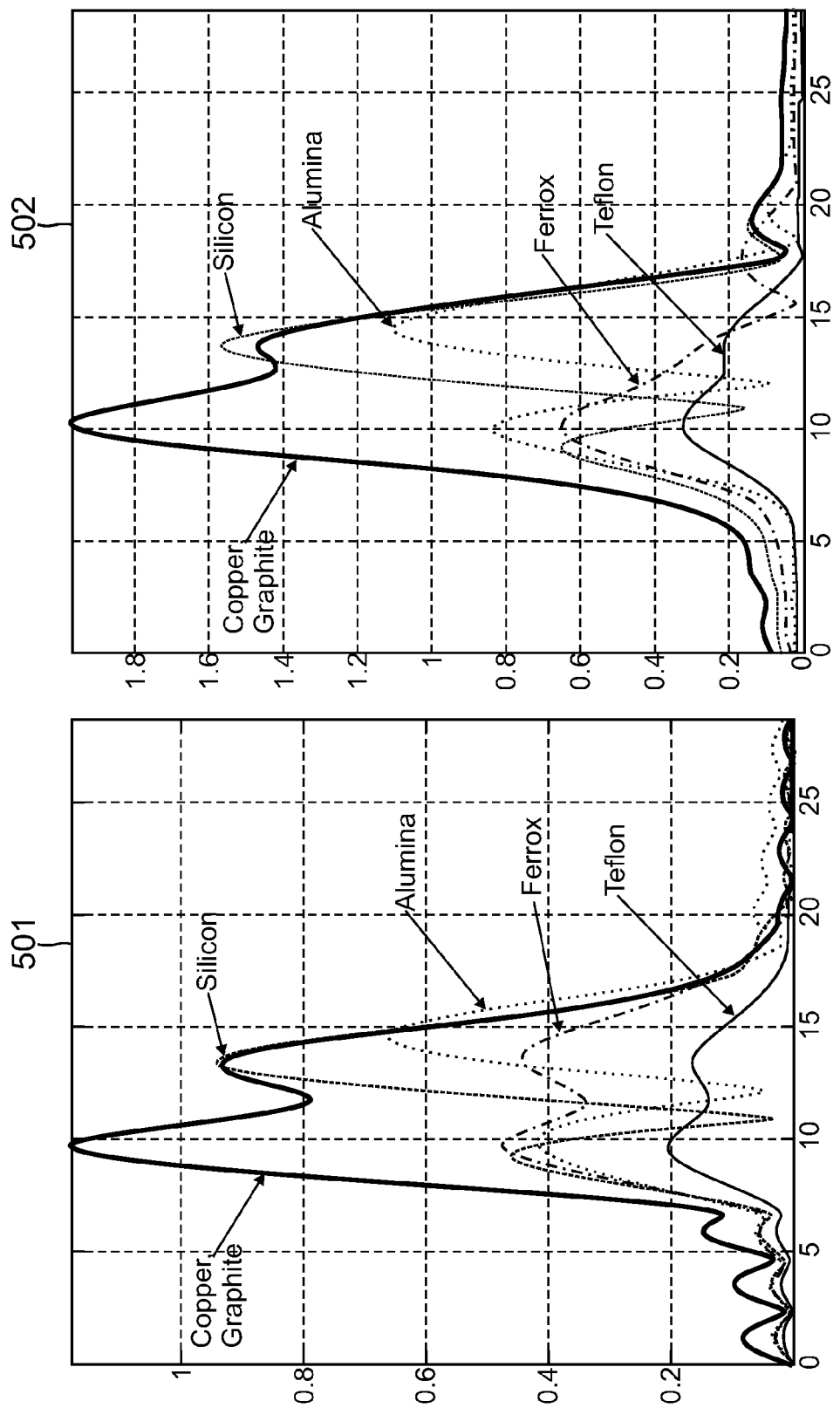
FIG. 5 is a set of graphs of signal strength vs. frequency illustrating a capability for discriminating some examples of types of inanimate objects by an RF imaging system in accordance with an embodiment.

FIG. 5 is a set of signal strength graphs 500 illustrating a capability for discriminating some examples of types of inanimate objects by an RF imaging system 100. Each graph plots relative signal strength (e.g., measured in dBm or dBmW) vs. frequency in GHz of target reflections. FIG. 5 illustrates the effectiveness of frequency domain analysis (e.g., using FFT) applied directly to target reflections for different materials. In FIG. 5, plot 501 shows the spectrum of reflected pulses transmitted by a radar unit 102 at a distance of 30 centimeters (cm) from an inanimate target, and plot 501 shows the spectrum of reflected pulses at a distance of 46 cm. As may be seen from plots 501, 502, there are distinct signatures (e.g., distribution of frequencies) in the spectrum depending on the specific material (as indicated in FIG. 5) and independent of the interrogator (e.g., radar detector unit 1021) distance from the target. Plots 501, 502 were produced using an excitation source (e.g., radar detector unit 1021) transmitting short duration ultra-wide band pulses, for example, 100 pico-second bipolar pulses at 15 GHz band width, and reflecting waveforms off a flat enclosure placed at 30 cm (for plot 501) and 46 cm (for plot 502) distance from the excitation source. Data was recorded and its spectrum was computed. Various materials (e.g., copper graphite, silicon, alumina, Ferrox™, and Teflon®) were used as the enclosure and analyzed independently. When a short duration ultra-wide band pulse is reflected from a target, the return signal is changed both in amplitude and waveform. Each target (e.g., copper graphite, silicon, alumina, Ferrox™, and Teflon®) has a unique effect (signature) on the reflected signal. Spectral analysis of the returned waveform may be employed to classify certain types of targets. The technique can be effectively applied, for example, to classification of concealed weapons under interrogation (e.g., surveillance using system 100) by identification of unique signature of a weapon. In addition, application of bi-spectral or higher order spectral processing may allow suppression of noise while preserving phase information.

Figure 6:
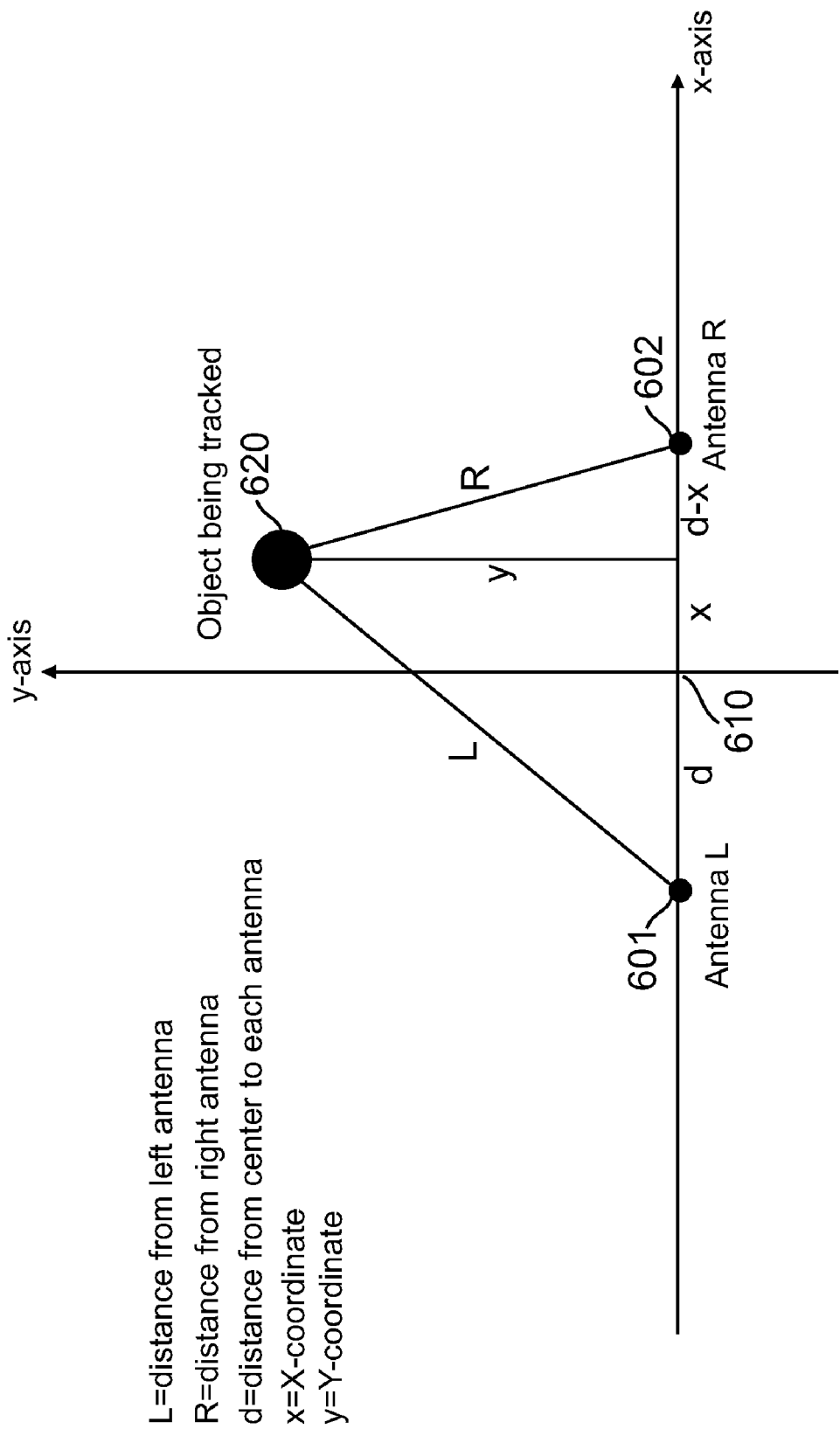
FIG. 6 is a diagram illustrating motion detection and tracking by an RF imaging system in accordance with an embodiment.

FIG. 6 shows parameters used for motion detection and tracking by an RF imaging system 100. As described above, display 300 may show the position and a trace or track of the changing positions of the target relative to the locations of Unit 1 and Unit 2 sensors 1021. The locations of Unit 1 sensor 1021 is shown in FIG. 6 as location 601 and the location of Unit 2 sensor 1021 is shown in FIG. 6 as location 602. A distance d, shown in FIG. 6, may be determined as half the distance between locations 601 and 602 so that an origin 610 for an x-y coordinate system (labeled in FIG. 6 by "x-axis" and "y-axis") may be located midway between locations 601 and 602 and oriented according to the positions of Unit 1 and Unit 2 sensors 1021, i.e., locations 601 and 602. The target position is shown in FIG. 6 as position 620, located at (x, y) from origin 610. The distance d−x is also shown in FIG. 6 along the x-axis. The target position 620 is located a distance L from location 601 (labeled Antenna L). The target position 620 also is located a distance R from location 602 (labeled Antenna R).

The following formulas may be derived from FIG. 6:

$$(d+x)^2+y^2=L^2 \quad (1)$$

$$(d-x)^2+y^2=R^2 \quad (2)$$

$$d^2+2dx+x^2+y^2=L^2 \quad (3)$$

$$d^2-2dx+x^2+y^2=R^2 \quad (4)$$

Subtracting (4) from (3) yields the x coordinate of target position 620:

$$x=(L^2-R^2)/4d \quad (5)$$

Then the y coordinate of target position 620 can be computed using:

$$y=\text{square\_root}(L^2-(x+d)^2) \quad (6)$$

It may noted that the above formulas are also valid in case x<0, or in other words when L<R. The above provides a simplified example restricted to two dimensions, e.g., x and y, and it may be apparent to one of ordinary skill in the art that the above can be extended to three dimensions (e.g., x, y, and z). For example, a z-axis may be provided through origin 610 and appropriate formulas may be derived for locating the height of target position 620.

Figure 7:
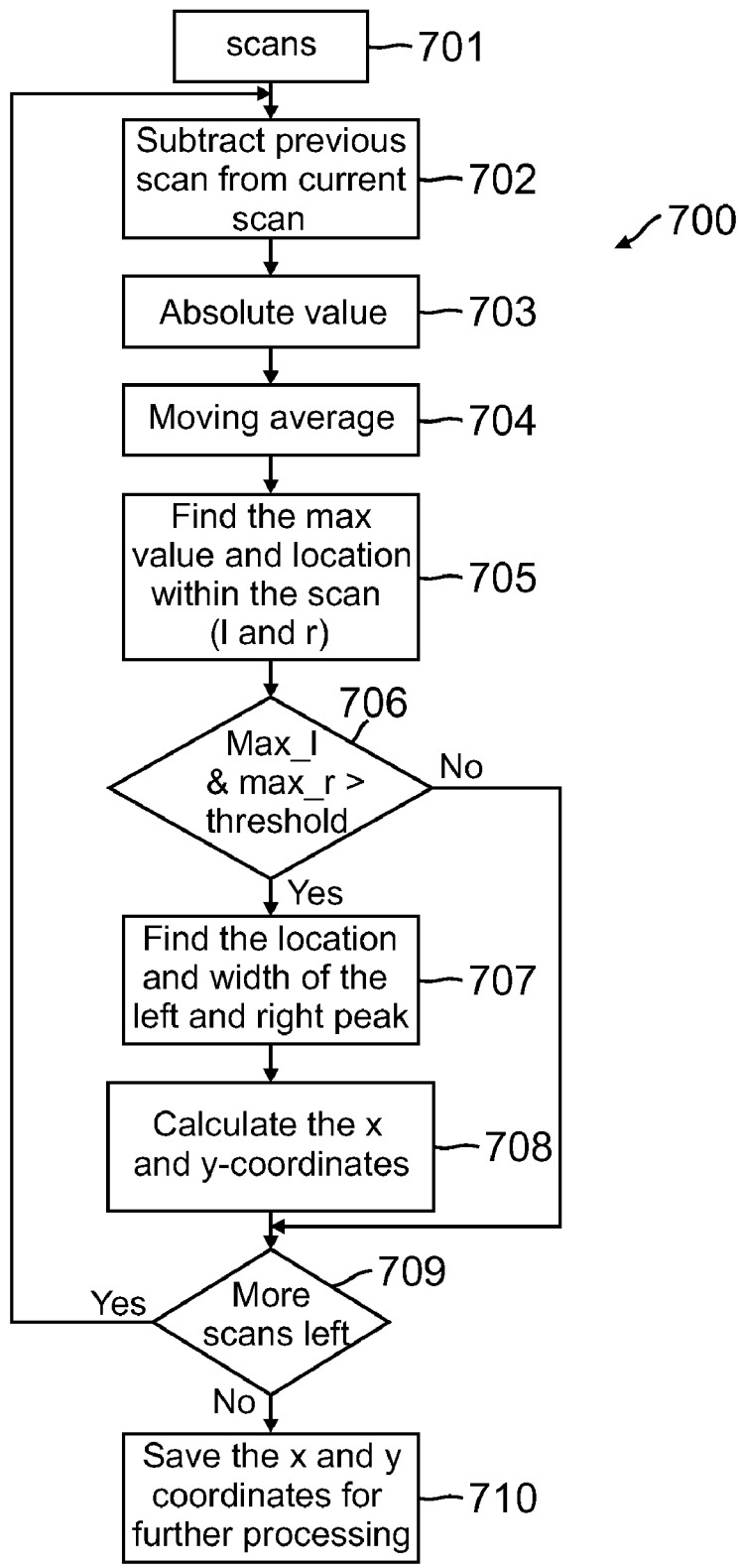
FIG. 7 is a flowchart illustrating a method for motion detection and tracking by an RF imaging system in accordance with an embodiment.

FIG. 7 illustrates a method 700 for motion detection and tracking by an RF imaging system 100. At step 701 radar scans may be provided to a processor—such as an application specific integrated circuit (ASIC)—for processing to determine target position, e.g., target position 620, and target movement, e.g., change of location of target position 620. The scans may include, for example, reflected waveforms from both Unit 1 (left) and Unit 2 (right) sensors 1021, and the processing of method 700 may be applied to both left and right waveforms or scans. A plurality of scans may be provided sequentially so that time position in the sequence may be referred to. For example, one scan may be previous or subsequent to another, and there may be a scan which is currently being processed. In addition, scans may be correlated before processing of the scans for motion detection begins at step 702.

At step 702, the previous scan provided at step 701 is subtracted from the current scan, e.g. step 702 may be regarded as a differentiator. Alternatively, the step 702 differentiator may be performed by subtracting a reference or background signal from each scan. In another alternative, the step 702 differentiator may be performed by first creating a slowly varying background signal by low-pass filtering the scans (e.g., taking a moving average) and then subtracting this background signal from each scan. At step 703, an absolute value of the result of the differentiator 702 may be computed. At step 704, a moving average of the results of step 703 may be kept as time or the sequence of scans progresses. At step 705, the maximum value and location within the scan may be found, to provide values for L and R, referring to FIG. 6. At step 706, comparison of the maximum values from step 705, e.g., max_L and max_R, are made to a pre-determined threshold value. If the maximum values exceed the pre-determined threshold processing may continue at step 707. If the maximum values do not exceed the pre-determined threshold processing may continue at step 709.

At step 707, the locations and widths of the left peak (from left waveform scans, e.g., provided by Antenna L of Unit 1 at location 601) and the right peak (from right waveform scans, e.g., provided by Antenna R of Unit 2 at location 602) may be found. In an alternative embodiment, the width of the peaks may be used to determine the size of the object, e.g., target position 620, being tracked. At step 708, x and y coordinates of target position 620 may be calculated, for example, using equations (5) and (6). Coordinates may be provided, for example, in three dimensions (e.g., x, y, and z) even though the example provided here uses only two dimensions for simplicity of illustration. At step 709, it is determined whether any scans from step 701 remain to be processed and, if so, processing returns to continue at step 702. Otherwise processing continues at step 710, where the coordinates, e.g., x and y or x, y, and z, of target 620 may be saved for further processing. For example, the coordinates may be used to display the current position of the target, e.g., target position 620, on display 301. Also, for example, the coordinates may be used to update the display of target tracking on display 302.

Figure 8A:
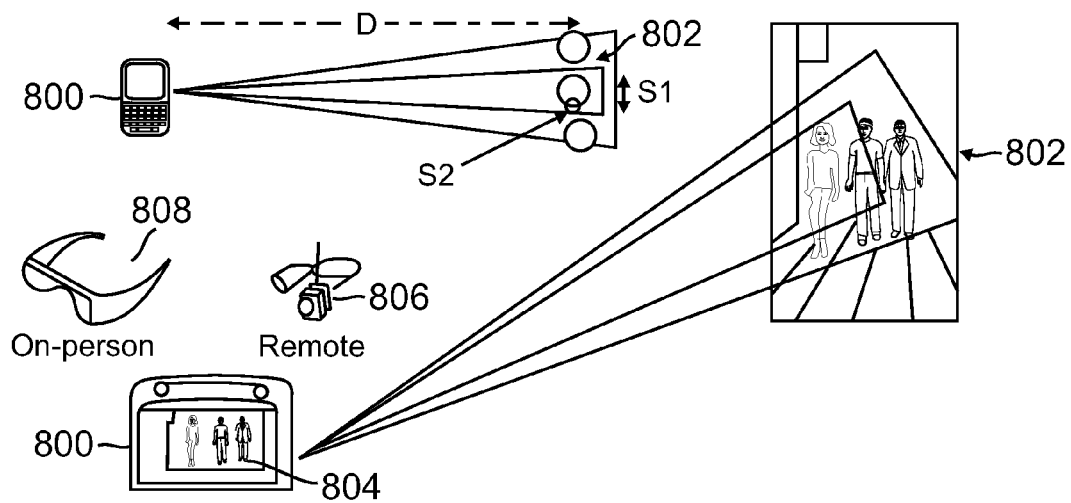
FIG. 8A and FIG. 8B are pictograms illustrating various features of a system for person-borne IED (PBIED) detection in accordance with one or more embodiments.
Figure 8B:
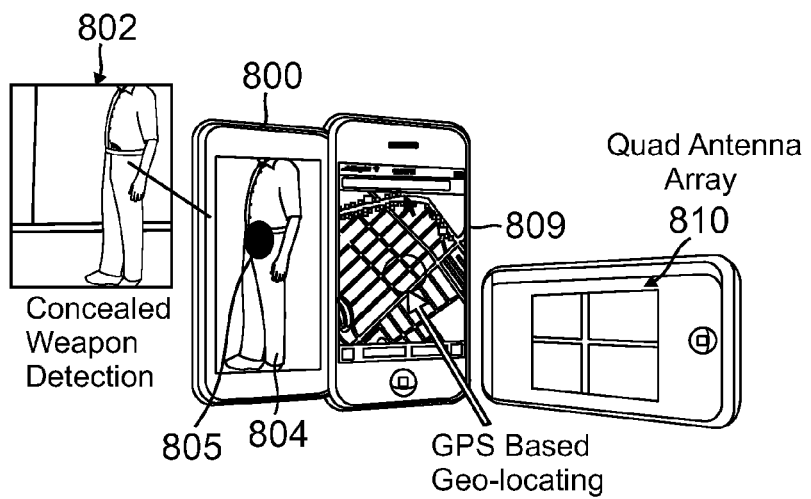

FIG. 8A illustrates a system 800 for optically assisted coarse and fine RF interrogation for detecting concealed objects, e.g., IEDs, using combined lower and higher center frequency radar and visible light optical imaging. FIG. 8A shows multi-sensor system 800 at a distance D from targets 802. Multi-sensor system 800 may provide multiple image resolutions of the targets 802; for example, a coarser resolution, S1, may be provided by a 5 GHz center-frequency radar system while a finer resolution, S2, may be provided by a 60 GHz center-frequency radar system. As shown in FIG. 8A, and more clearly in FIG. 8B, a visual image 804 of targets 802 may be provided by an optical camera system that coordinates with the two radar systems. FIG. 8B, which shows an i-Phone®-size multi-sensor system 800, illustrates an example display in which visual image 804 shows an outline of a person with a radar image 805 of a suspect object shown as a dark spot on the person's outline. Multi-sensor system 800 may also include a remote system 806 and an on-person system 808, which can be used for viewing and operating multi-sensor system 800. FIG. 8B illustrates a capability for coordinating an image 809 for GPS-based geo-locating with the display from system 800. System 800 may also include a quad antenna array 810 as shown in FIG. 8B.

In one embodiment, multi-sensor system 800 may operate, for example, as an ultra wideband, low-power, high-performance, portable RF imager. System 800 may, for example, emit rapid, wideband, narrow pulses with the same bandwidth at two different center frequencies and two different beam widths that can reflect from a metallic surface adjacent to fat or water. A specially designed antenna system may allow a very fine beam to focus on each individual. The transmitted signal may also penetrates glass, wood, and dry wall. In the receiver, a pulse detector circuit may be employed to identify the reflections. Amplitude and delay information may be extracted and through signal processing hardware, software, and image construction algorithms, an effective cross section of the target metal (e.g., PBIED at target 802) may be presented. A light, mountable version of the unit weighting less than 6.0 lb., having dimensions, for example, no greater than 9 in.×10 in.×4 in., may be mounted or placed covertly, and may sends information wirelessly, e.g., via remote system 806, for remote real time processing, analysis, and display.

Referring, still, to FIGS. 8A and 8B, the coarser resolution, S1, may be useful, for example, for distinguishing targets of interest, e.g., targets 802, from clutter. Clutter usually refers to radio frequency echoes returned from targets which are uninteresting to the radar operators. Such targets may include natural objects such as ground, sea, precipitation (e.g., rain, snow or hail), sand storms, animals (especially birds), atmospheric turbulence, and other atmospheric effects (e.g., ionosphere reflections, meteor trails, and three body scatter spike). Clutter may also be returned from man-made objects such as buildings and, intentionally, by radar countermeasures such as chaff.

A 5 GHz center frequency radar system of multi-sensor system 800, providing coarser resolution, S1, data, may be useful for classification of a living object in a clutter. By employing radar scans on the target area, e.g., targets 802, potential threats may be identified by examining the spectral contents of the scan. Human heartbeat and breathing are repetitive and can potentially be detected despite the presence of non-periodic clutter such as a moving crowd or foliage between the radar system 800 and the target 802. The period of the human heartbeat is typically about 1 second, corresponding to a frequency of 1 Hz. The breathing rate is lower, typically 0.5 Hz or less. Clutter may be assumed to be non-periodic in these two frequency ranges and above the Nyquist frequency to eliminate aliasing problems. The spectral contents of a radar scan can be found by employing the discrete Fourier transform (DFT) on the radar signal during successive scans.

The DFT may be defined as follows:

$$X_k = \sum_{n=0}^{N-1} x_n e^{-j2\pi k n/N} \quad k = 1, 2, \ldots, N \tag{1}$$

where: N=number of signal points; $x_n$=input signal in time domain; and $X_n$=DFT output in frequency domain.

Before applying the DFT, the system may need to determine the best input to the DFT. One simple way is to find the row with the maximum energy and feed the samples from this row to the DFT to determine the frequency contents of the row as follows:

$$E(r) = \sum_{c=0}^{NC-1} \text{abs}(x_{r,c}) \ r = 1, 2, \ldots, NR \qquad (2)$$

where: $E(r)$=energy of row r; NR=number of rows; NC=number of columns; and $x_{r,c}$=the element at row r and column c of the input matrix x. To determine the row of the input matrix to be used for the DFT input, find the maximum of $E(r)$ and the corresponding index maxrow:

$$x_n = x(\text{maxrow}, c) c = 1, 2, \ldots, NC \qquad (3).$$

By observing the magnitude of the DFT output, the frequency contents of the scan can be determined. The quality of the spectral analysis is proportional to the number of time domain samples available at the DFT input. Doubling the number of input samples may double the observation time but increase the signal-to-noise ratio by 3 dB.

Figure 9:
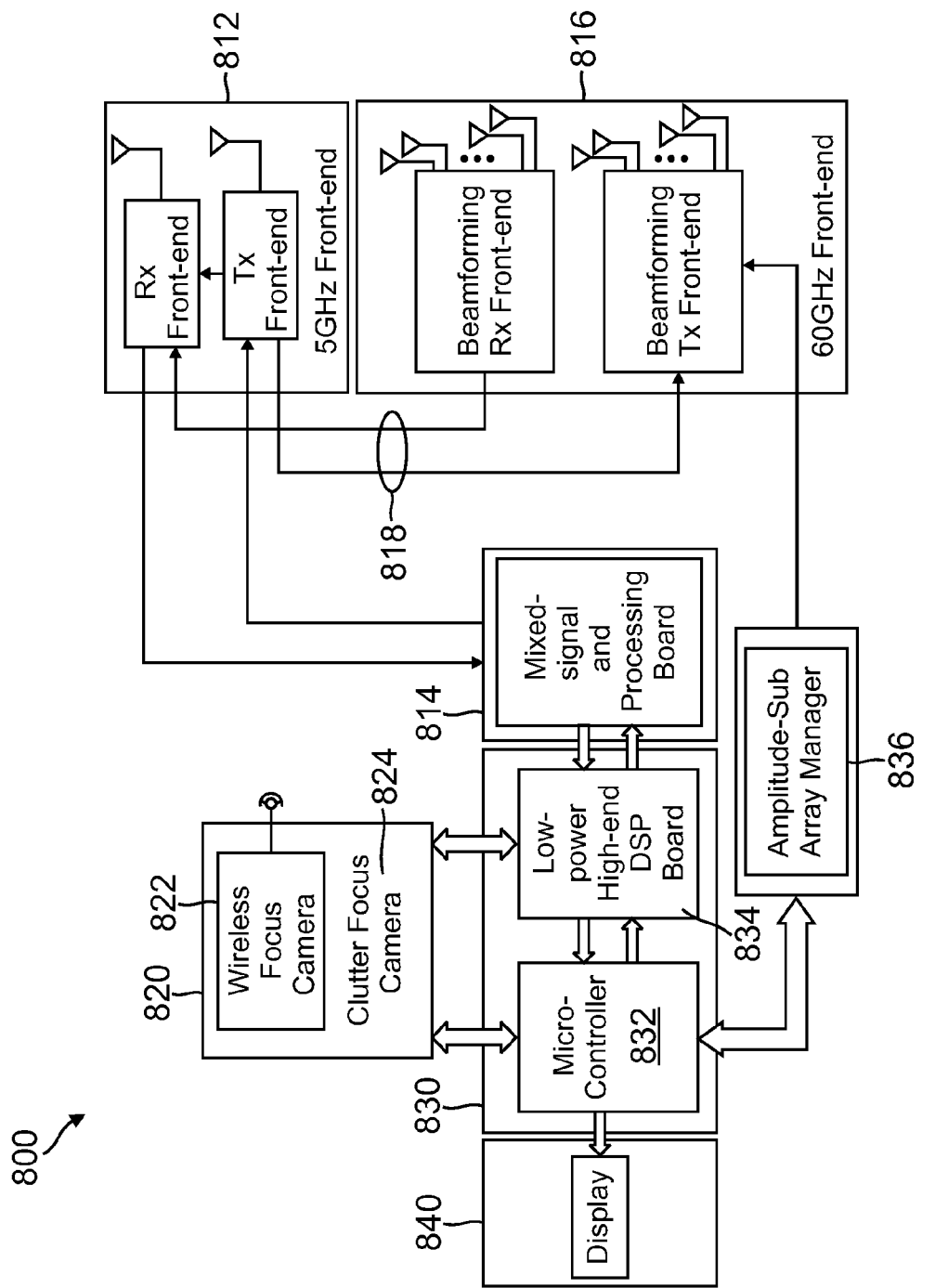
FIG. 9 is a system block diagram of a system for PBIED detection in accordance with an embodiment.

FIG. 9 is a system block diagram of a multi-sensor system 800 in accordance with an embodiment, which may be used for PBIED detection, for example. Multi-sensor system 800 may include a 5 GHz radar system front end 812 interfaced to mixed-signal and processing module 814. Multi-sensor system 800 may include a 60 GHz radar system front end 816, which may be up-converted and down-converted to 60 GHz at interface 818 to 5 GHz radar system front end 812. An optical camera module 820 may provide an overlay of optical camera and zooming capability on the radar imaging provided from 5 GHz radar system front end 812 and 60 GHz radar system front end 816. Optical camera module 820 may include commercially available off-the-shelf (COTS) components. As shown in FIG. 9, in one embodiment optical camera module 820 may include a wireless focus camera 822 and a cluster focus camera 824. Camera module 820 may interface, as shown in FIG. 9, to processing module 830. Processing module 830 may include a micro-controller module 832 and digital signal processing (DSP) module 834, each of which may interface to each other and to camera module 820 as indicated in FIG. 9. DSP module 834 may include a low-power, high-end DSP board and may interface to a mixed-signal and processing board of mixed-signal and processing module 814, as shown. Micro-controller module 832 may interface as shown to an amplitude sub-array manager 836. Amplitude sub-array manager may provide control inputs, as shown in FIG. 9, to 60 GHz radar system front end 816 for beam forming Micro-controller module 832 may interface to a display module 840 for providing coordinated imaging from the 5 GHz radar system, 60 GHz radar system, and optical camera systems that, for example, enables overlaying of the visual image 804 on the imaging from the radar system digital signal processing provided from processor module 830. Processing module 830 may, for example, provide processing of the camera image overlay for zooming and focus and synchronization of frames to the target detected by radar.

Figure 10:
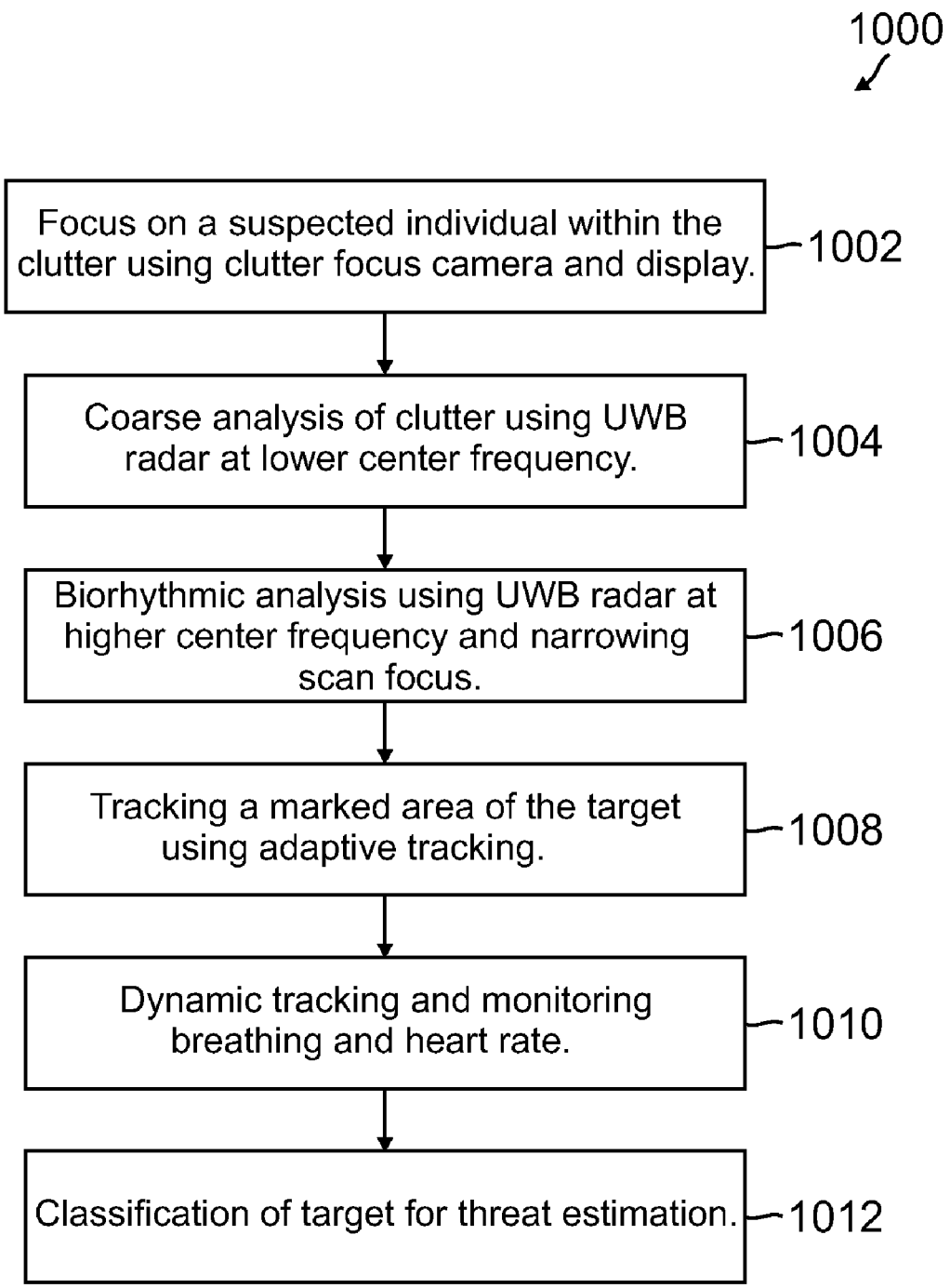
FIG. 10 is a flowchart illustrating a method for PBIED detection in accordance with an embodiment.

FIG. 10 is a flowchart illustrating a method 1000 for PBIED detection, in accordance with an embodiment. Step 1002 of method 1000 may include using a miniature camera—e.g., camera module 820—in a mini-PC (personal computer)—e.g., processing and display unit 830, 840—to focus on a suspected individual within the clutter. At step 1004, coarse analysis of clutter (suspect's surroundings) using 5 GHz center-frequency radar system may focus on the target area for elimination of background movement. At step 1006, biorhythmic (e.g., respiration and heart beat, if detectable) registration (marking) of a suspect individual may be obtained using fine analysis (narrow beam) 60 GHz center-frequency radar system. As soon as a heartbeat or breathing pattern starts emerging, the scan focus may be narrowed to such marked area. At step 1008, an adaptive tracking algorithm may be used to track the marked area of the target. This step effectively uses the capability of hardware in both the lower and higher center frequency radar systems (e.g., 5 GHz center-frequency radar system and 60 GHz center-frequency radar system) collectively for sustaining constant calibration and fixed gain at the receiver, effectively using better than centimeter range resolution of a highly narrow RF beam from higher, 60 GHz center-frequency radar in line-of-site (LOS). At step 1010, the method may continue dynamic tracking and monitoring the marked target area until sufficient amount of information has been gathered through massive signal processing by correlating the biorhythmic pattern (processing gain) to make a more reliable determination regarding the presence of potential threats such as rapid breathing or rapid heartbeat or both. At step 1012, classification of the target may be provided, e.g., for a threat estimation or elimination process.

Figure 11:
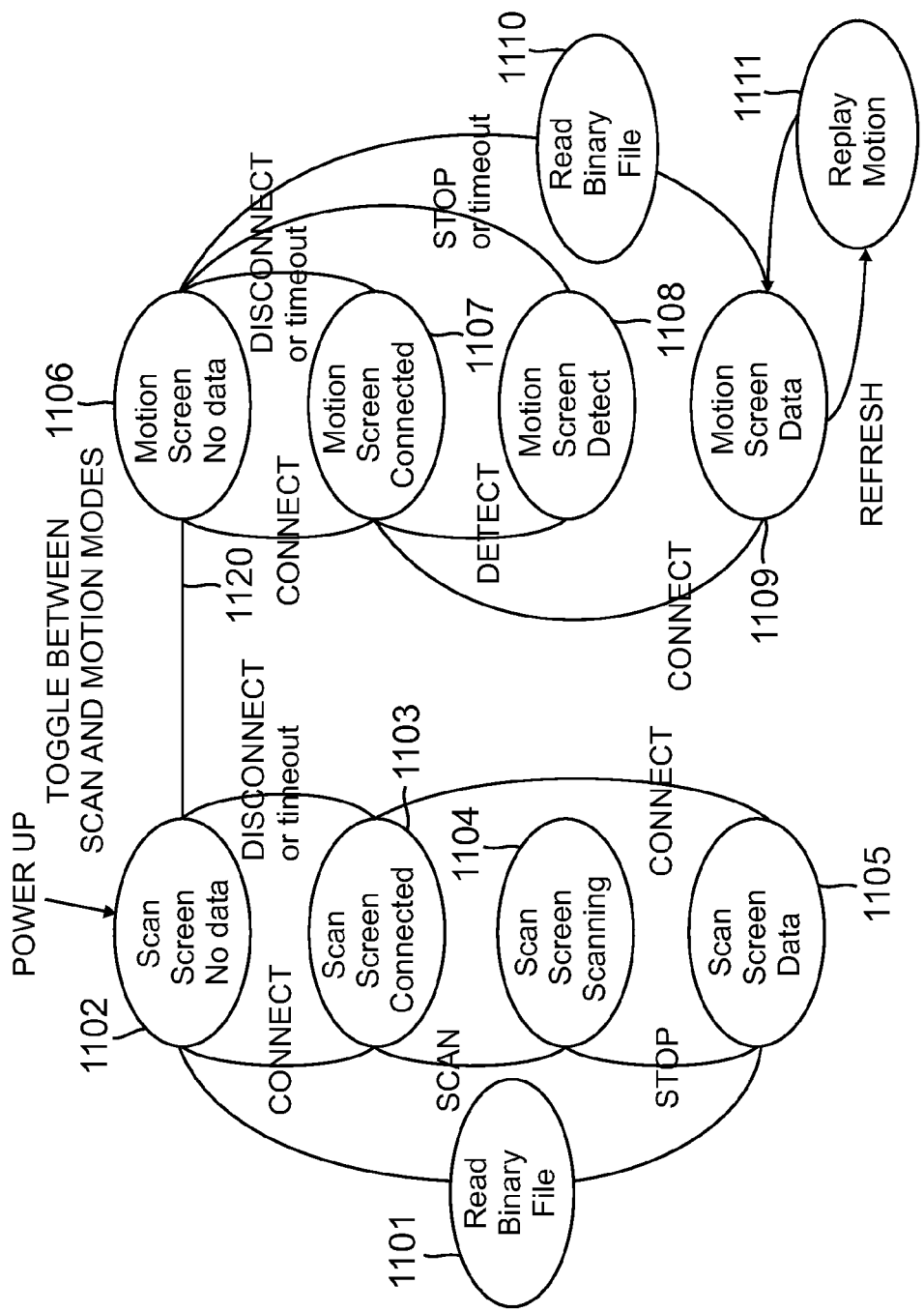
FIG. 11 is a state transition diagram for software for a system for PBIED detection in accordance with an embodiment.

FIG. 11 is state transition diagram for software for a system for PBIED detection in accordance with an embodiment. Software operating on processing module 830, for example, may provide various modes of functioning for multi-sensor system 800. For example, states 1101 through 1105 may be entered when the system is in a scan mode, whereas states 1106 through 1111 may be entered when the system is in a motion mode. Toggling between the two modes may be provided, for example, by state transition 1120 which may be traversed in either direction between state 1102 and state 11006. States 1103, 1104 and states 1107 and 1108 may be entered, for example, when there is active radar transmission and the system may reside in any of the remaining states, e.g., 1101, 1102, 1105, 1106, 1109, 1110, or 1111, when radar transmission is not active. The various states and transitions between them, as illustrated by example shown in FIG. 11, may provide for a variety of methods of functioning, for example, of multi-sensor system 800 shown in FIGS. 8 and 9.

Figure 12:
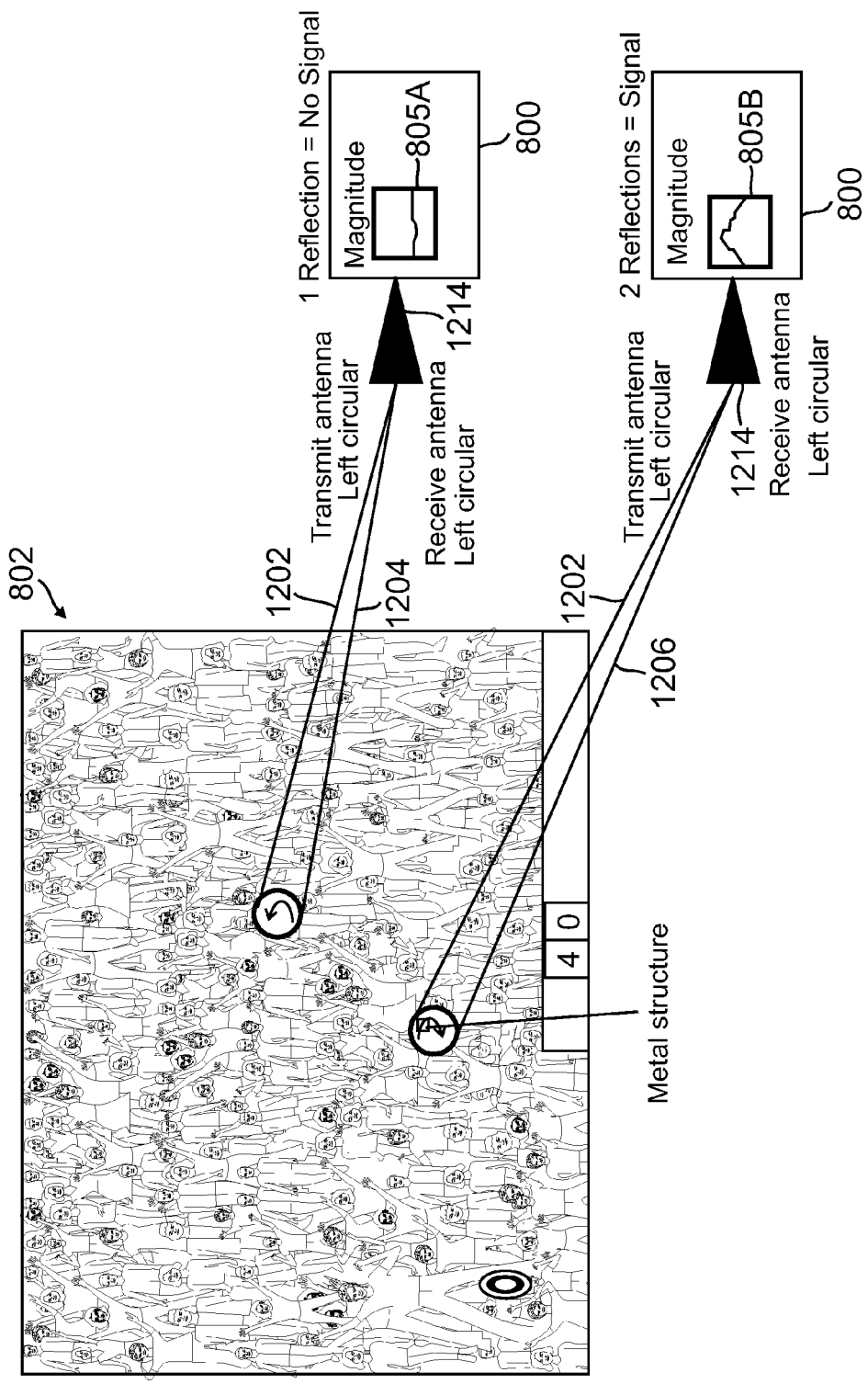
FIG. 12 is a pictographic diagram illustrating a system for PBIED detection in accordance with another embodiment.

FIG. 12 illustrates an embodiment of a system 800 for PBIED detection that employs circular polarization of radar signals. System 800 as illustrated in FIG. 12 may exploit effects of circular polarization of electromagnetic radiation at the 60 GHz frequency band. Tests have shown that electromagnetic radiation at about 60 GHz can behave very much like visible light in terms of preserving the polarization orientation of a signal reflected off an object. The effect may be employed to provide a mechanism to detect a metal structure on human bodies according to another embodiment as diagrammed in FIG. 12.

As illustrated in FIG. 12 if the transmitted left-hand circular polarized beam 1202 only experiences one reflection (e.g., from a human body) the received signal 1204 may become right-hand circular polarized and cannot be detected by the left-hand circular polarized receive antenna 1214. In that case, system 800 may display a radar signature 805A indicative that no suspect object has been detected, as shown in FIG. 12. If, however, the transmitted left-hand circular polarized beam 1202 hits a metallic structure the left-hand circular polarized beam 1202 may be reflected more than once and parts of the received signal 1206 may now be left-hand circular polarized, which can now be detected by the left-hand circular polarized receive antenna 1214. In that case, system 800 may display a radar signature 805B indicative that a suspect object has been detected, as shown in FIG. 12. Thus, in a method for detecting a PBIED in a crowd of people, system 800 may be used to scan a crowd with a 60 GHz circular polarized beam (e.g., transmitted left-hand circular polarized beam 1202) and, depending whether or not a metal structure is present, a signature 805A or 805B, as shown in FIG. 12, may be displayed by system 800.

This signature (e.g., signature 805A or 805B) from the RF image can be fused with the optical display to allow for fast and simple detection of a PBIED. As shown in FIG. 8B, the optical image 804 may be simplified by filtering and only displaying the human silhouettes which then can be overlaid with the RF image 805 from the circular polarized radar antenna 1214 to detect metallic cross sections readily and in real-time. No analysis on the RF image 805 needs to be carried out and the raw radar signal waveform (e.g., signature 805A or 805B) can be displayed directly, for example, as a color bar in the optical image 804. The display may be implemented so that the color bar may change color in the optical image if the person in the optical image is carrying a PBIED.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A system comprising:
   a first ultra-wideband (UWB) radar system configured to operate at a first center frequency;
   a second ultra-wideband (UWB) radar system configured to operate at a second center frequency that is higher than the first center frequency;
   a camera system configured to operate in conjunction with the second radar system; and
   a processing unit for providing:
      coarse analysis of clutter using data provided by the first radar system;
      biorhythmic analysis using fine beam data provided by the second radar system; and
      focusing the camera system based on the biorhythmic analysis.

2. The system of claim 1, wherein:
   the second radar system uses a circular polarized beam to distinguish whether the target includes a suspect object.

3. The system of claim 1, wherein:
   the second radar system uses a circular polarized beam to distinguish whether the target includes a suspect object; and
   the processor includes a signal processing and imaging module configured to overlay a radar image of the suspect object on a visual image of the target.

4. The system of claim 1, wherein the processor includes a signal processing and imaging module configured to:
   extract target material composition data from radar pulse reflections of the fine beam data provided by the second radar system using frequency analysis applied directly to the radar pulse reflections.

5. The system of claim 1, wherein the processor includes a signal processing and imaging module configured to:
   extract target material composition data from radar pulse reflections of the fine beam data provided by the second radar system using frequency analysis applied directly to the radar pulse reflections for determining the presence of a suspect object; and
   overlay a radar image of the suspect object on a visual image of the target.

6. The system of claim 1, wherein the processor includes a signal processing and imaging module further configured to:
   determine target movement;
   display target movement tracking information on a display unit;
   focus the camera system based on the target movement tracking information; and
   provide a visual display from the camera system overlaid on the target movement tracking information display.

7. The system of claim 1, wherein the processor includes a signal processing and imaging module further configured to:
   receive scan data samples of a target;
   extract biometric data from the scan data samples using frequency analysis; and
   determine a type of the target based on a pre-determined radar signature profile using classification of amplitude peak frequencies that vary from species to species.

8. The system of claim 1, wherein the processor includes a signal processing and imaging module further configured to:
   receive scan data samples of a target;
   extract biometric data from the scan data samples using frequency analysis; and
   distinguish a human target as a type of target based on a heart rate profile.

9. The system of claim 1, wherein the processor includes a signal processing and imaging module further configured to:
   receive scan data samples of a target;
   extract biometric data from the scan data samples using frequency analysis; and
   distinguish a human target as a type of target based on a respiratory rate profile.

10. The system of claim 1, wherein the processor includes a signal processing and imaging module further configured to:
    receive scan data samples of a target;
    extract biometric data from the scan data samples using frequency analysis; and
    distinguish an inanimate object as a type of target based on a type of material signature profile.

11. A method comprising:
    scanning an inhabitable area using a first ultra-wideband (UWB) radar system operating at a first center frequency;
    performing coarse analysis using data provided by the first radar system to isolate a target of interest from clutter;
    scanning the target using a second ultra-wideband (UWB) radar system operating at a second center frequency that is higher than the first center frequency;
    performing fine analysis using narrow beam data provided by the second radar system; and
    focusing a camera system on the target.

12. The method of claim 11, wherein the scanning using the second radar system further comprises:
    using a circular polarized beam to distinguish whether the target includes a suspect object.

13. The method of claim 11, wherein:
    the scanning using the second radar system further comprises using a circular polarized beam to distinguish whether the target includes a suspect object; and further comprising:
    overlaying a radar image of the suspect object on a visual image of the target.

14. The method of claim 11, further comprising:
    processing the narrow beam data provided by the second radar system to recover frequency profile information from the target and to extract biometric data using frequency analysis;
    using frequency profile information recovered from the target to differentiate between a live person, an animal, or an object as a target type
    displaying the target type and position on an image display; and overlaying a visual image of the target from the camera system on the image display.

15. The method of claim 11, further comprising:

determining target movement;

displaying target movement tracking information on an image display;

focusing the camera system based on the target movement tracking information; and displaying a visual image of the target from the camera system overlaid on the display of target movement tracking information.

16. The method of claim 11, further comprising:

extracting target material composition data from radar pulse reflections of the narrow beam data provided by the second radar system using frequency analysis applied directly to the radar pulse reflections.

17. The method of claim 11, further comprising:

receiving scan data samples of a target;

extracting biometric data from the scan data samples using frequency analysis; and determining a type of the target based on a pre-determined radar signature profile using classification of amplitude peak frequencies that vary from species to species.

18. The method of claim 11, further comprising:

receiving scan data samples of a target;

extracting biometric data from the scan data samples using frequency analysis; and distinguish a human target as a type of target based on a heart rate profile.

19. The method of claim 11, further comprising:

receiving scan data samples of a target;

extracting biometric data from the scan data samples using frequency analysis; and distinguish a human target as a type of target based on a respiratory rate profile.

20. The method of claim 11, further comprising:

receiving scan data samples of a target;

extracting biometric data from the scan data samples using frequency analysis; and distinguish an inanimate object as a type of target based on a type of material signature profile.

* * * * *